United States Patent [19]

Van Landeghem

[11] 4,277,444

[45] Jul. 7, 1981

[54] APPARATUS FOR CONVERTING HYDROCARBONS

[75] Inventor: Hugo Van Landeghem, Oytier Saint Oblas, France

[73] Assignee: Institut Francais du Petrole, Rueil-Malmaison, France

[21] Appl. No.: 43,511

[22] Filed: May 29, 1979

[30] Foreign Application Priority Data

May 29, 1978 [FR] France ................................. 78 16372

[51] Int. Cl.³ .............................. B01J 8/00; B01J 8/12
[52] U.S. Cl. .................................... 422/191; 422/192; 422/216; 422/218; 422/219; 208/171
[58] Field of Search ............... 422/190, 191, 192, 193, 422/213, 216, 218, 219, 220; 208/165, 168, 171

[56] References Cited

U.S. PATENT DOCUMENTS

| 3,706,536 | 12/1972 | Greenwood et al. ........... 422/216 X |
| 3,907,511 | 9/1975 | Forbes et al. ...................... 422/216 X |
| 3,909,208 | 9/1975 | Boret et al. ............................ 422/218 |
| 3,927,987 | 12/1975 | Winter et al. .................... 422/218 X |
| 4,040,794 | 8/1977 | Stone ................................ 422/216 X |
| 4,110,081 | 8/1978 | Millar et al. ...................... 422/216 X |
| 4,135,886 | 1/1979 | Kuchar ................................. 422/216 |
| 4,141,690 | 2/1979 | Persico et al. ....................... 422/216 |
| 4,167,553 | 9/1979 | Persico et al. ....................... 422/216 |

Primary Examiner—Bradley Garris
Attorney, Agent, or Firm—Millen & White

[57] ABSTRACT

An improved radial reactor for hydrocarbon conversion is provided, having a new catalyst collector whose center is located nearer to the internal wall than to the external wall of the annular enclosure for receiving the moving catalyst bed.

6 Claims, 5 Drawing Figures

APPARATUS FOR CONVERTING HYDROCARBONS

BACKGROUND OF THE INVENTION

Most of the reactors used in the oil industry, for example those for the catalytic conversion of hydrocarbons and comprising, for example, fixed or moving catalytic beds, are either of the axial or radial type.

The catalysts usually consist of at least one metal, for example, a metal of the groups VIII, VI A, VII A or of another group, the metal being carried on a conventional carrier (alumina, silica, silica-alumina, etc.)

In a substantially vertical axial reactor whose bottom has a spherical or ellipsoidal shape, the charge or reactants to be treated are supplied from the top of the reactor through a distributor and are passed through a layer of a solid material consisting essentially of the catalyst carrier, this solid material being, for example, in the form of balls; this layer provides for a better distribution of the reactants throughout the catalyst mass. After having passed through the catalyst, the reactants are passed through two layers of different grain size, for example, two layers of balls consisting essentially of the catalyst carrier, the one being used to retain the catalyst while the other one of bigger grain size makes easier the recovery of the products through the collector located at the bottom of the reactor, while sustaining the catalyst and alumina located thereover.

The main disadvantage of the axial reactors, where the reactants are circulated vertically, downwardly, parallel to the axis of the reactor (whence the name axial reactor), is that they require a large cross-section for the catalyst layer, while the height thereof is relatively low, in order to have a low pressure drop; those reactors with bottoms of spherical or ellipsoidal shape have a large volume which makes their use of reduced economic interest.

In the radial reactors, the catalyst bed has the shape of a vertical cylindrical ring, internally limited by a grid retaining the catalyst and externally either by the reactor wall and scallops (or shells), or by another grid of the same type as the internal grid. The reactants are supplied from the top of the reactor and are distributed throughout the catalyst mass, either by scallops or through the empty space between the external grid for retaining the catalyst and the wall of the reactor. The circulation within the catalyst mass is from the exterior to the interior, substantially along the reactor radii (whence the name radial reactor). After having passed through the catalyst bed, the reactants are collected in a cylindrical vertical collector, through the internal grid for retaining the catalyst and a sparsely perforated sheet-iron plate provided for ensuring better distribution of the reactants through the catalyst bed, while avoiding preferential passages therethrough.

SUMMARY OF THE INVENTION

This invention relates to an improvement of such radial reactors particularly in the catalyst collectors therefor.

DETAILED DISCUSSION

The main disadvantage of the radial reactors lies in the fact that the catalyst settles in the course of time, notably as a consequence of the radial flow of gas, and this settling results in problems when discharging the catalyst, particularly when maintaining the level of catalyst activity in a radial reactor, by replacing the used catalyst, discharged from the bottom of the reactor, with fresh catalyst supplied from the top of the reactor; means must be provided for discharging the catalyst, either periodically or continuously. The process of the invention provides for suppressing these problems, essentially when continuously discharging the catalyst from the reactor.

This discharge is only possible if the horizontal component of the force attributable to the reactants acting on the catalyst particle is controlled with respect to the vertical component of this force added to the force of gravity.

Figure 1:
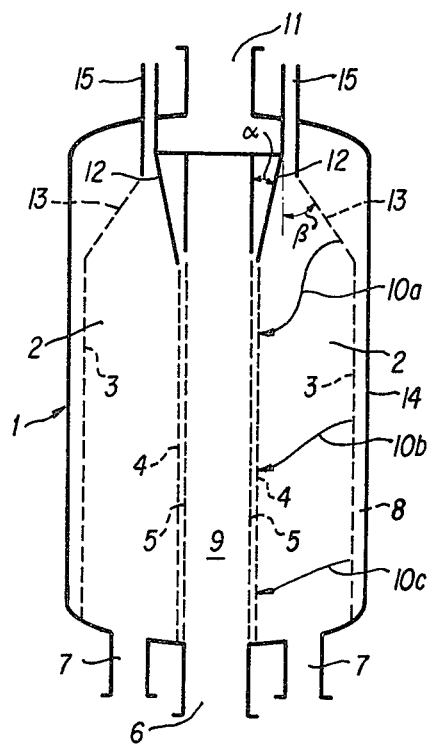
FIG. 1 is a cross-sectional view of a prior art radial reactor.

FIG. 1 illustrates prior art radial reactor (this reactor scheme has been simplified by providing the reactor with only one catalytic enclosure; however the reactor may comprise several stacked catalytic enclosures. Several serially or parallel arranged reactors may also be used, each of them comprising one or more catalyst enclosures).

FIG. 1 is not part of the invention. Reactor 1 is a vertical cylindrical elongated chamber; its bottom is ellipsoidal; this chamber comprises a circular enclosure 2 containing the catalyst bed; the external walls 3 of the enclosure and the internal walls 4 thereof are cylindrical and appear as a rule as a grid able to retain the catalyst within enclosure 2 and to let the reactants enter into the enclosure or leave the enclosure (a perforated sheet-iron plate or a wall of fritted inert material may be used instead of a grid).

The reactants are supplied to the reactor through the inlet duct 11; they flow into the external distributor (8), which is the space limited by the walls 14 of the reactor and the external grid 3 (this distributor 8 is thus adjacent to the annular enclosure 2).

The reactants pass from the distributor 8 through the external grid (3) and to the catalyst bed of the annular enclosure 2. The products leave that enclosure through the internal grid 4 (and also through the sparsely perforated wall 5, which is often more advisable; this wall provides for a better distribution through the catalyst by avoiding preferential passages therethrough), they are collected in the internal collector 9, which is the internal space of the reactor 1 limited by the internal wall of the annular enclosure 2, and leave the reactor through the outlet duct 6. The catalyst is introduced at the top of each annular enclosure through at least one inlet 15, and is discharged continuously through at least one collector 7.

An easier passage of the reactants and the catalyst in the upper portion of the reactor is favored by placing, at the top of the reactor, a screen 12 for deflecting downwards the path of the reactants in the upper portion of the annular enclosure. This screen 12 consists of a continuous enclosure (no perforation).

This screen has a height amounting to 80% to 300% of the total width of each annular enclosure and has the shape of an inverted truncated cone whose cross-section increases upwardly, this truncated cone having a common axis with the internal cylindrical wall of each annular enclosure; the cross-sectional area of the smaller base of the truncated cone is substantially that of the cross section of the internal cylindrical wall of each annular enclosure, and the angle α between the axis of the truncated cone and one of its generators is between 10 and 40 degrees.

Everything occurs as if the perforations of the grid 4 at the top of the annular space 2 were plugged.

The radial reactor is preferably so designed that the reactant flow through the catalyst bed is not disturbed.

The external wall of each annular enclosure has the shape of a truncated cone in its upper portion, amounting to 10–40% of the height of each annular enclosure (and not a cylindrical shape as the remainder of the external wall); the cross-section of this truncated cone increases downwardly, the larger of the two bases of the truncated cone having substantially the same cross-section as the external cylindrical wall of the annular enclosure, and the angle β of the axis of the truncated cone to one of its generators being from 10 to 40 degrees.

In other words, the higher portion of the reactant inlet grid 3 has been replaced by a truncated grid 13.

In most cases the height of this truncated portion of the external wall 13 is substantially identical to the height of the truncated cone 12.

Figure 2:
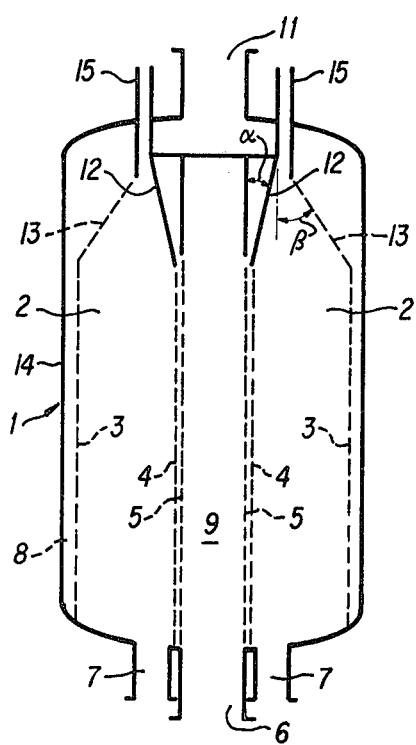
FIG. 2 is a cross-sectional view of an improved reactor according to the present invention.

FIG. 2 illustrates the invention. It differs from FIG. 1 in the position of the collectors 7 for continuously discharging the catalyst.

It has been found that, in a radial reactor, such as described in FIGS. 1 and 2, the path of the reactants in the portion of the catalytic mass located below the screens 12 and 13 (path 10a on FIG. 1) comprises:
(a) a substantially horizontal path, perpendicular to the inlet grid for the reactant,
(b) an oblique path, and
(c) a horizontal path near collector 9.

In the lower portion of the catalytic mass, the path of the reactants (paths 10b and 10c in FIG. 1) is less inclined and is close to horizontal at the bottom of the reactor.

These three paths 10a, 10b and 10c differ in their shape and length and in the amounts of reactants along these paths.

Figure 3:
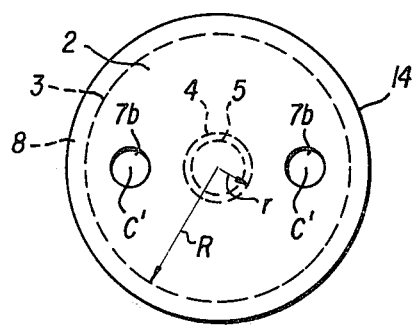
FIG. 3 is a cut of the bottom of the prior art reactor of FIG. 1.

After a long period, and essentially in the continuous processes with continuous supply of catalyst into the reactor and continuous discharge of catalyst from the reactor, the catalyst particles tend to follow the paths 10a, 10b and 10c of FIG. 1, this being particularly true for the path of the catalyst in the lower portion of the reactor in the vicinity of the arrow 10c of FIG. 1. In the prior art, the catalyst collectors such as 7 of FIG. 1 are always located in the central portion of the ring delimited by the annular enclosure. Thus, in FIG. 3, which is a cut of the bottom of the reactor of FIG. 1, there can be seen the wall 14 of the reactor, the external wall 3, and the internal wall 4 of the annular enclosure and the perforated wall 5; the annular ring delimits a ring whose width is R−r (R is the radius of the external grid 3, r is the radius of the internal grid 4). Thus, according to the prior art, a collector for discharging the catalyst, such as 7-b, is located so that its center C' is located at about half the width of the annular enclosure, i.e. about midway between the external and internal walls 3 and 4 of the annular enclosure.

Consequently, catalyst particles carried towards the wall 4 in the direction of the collector 9 must then travel more or less in counter-current to the reactants and to other catalyst particles (carried also by the reactants) to be discharged through the collector 7. This results very quickly in unavoidable settlings and alterations of the whole catalyst mass in the lower portion of the reactor. These alterations result in irregularities in the discharge of the catalyst through collector 7, thus resulting in a less efficient performance of the reaction effected in the reactor.

Figure 4:
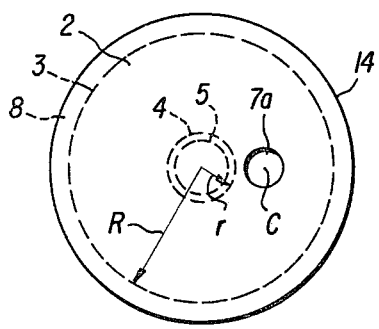
FIGS. 4 and 5 are cuts illustrating the bottom of a reactor according to the present invention.

The arrangement of the collector 7 according to the invention remedies these disadvantages. According to the invention, the center C of each collector such as 7-a in FIG. 4 is located closer to the internal wall 4 than to the external wall 3 and at a distance from the internal wall of the annular enclosure 2 less than $(R-r)/3$ and preferably less than $(R-r)/4$, $R-r$ being the width of the annular enclosure.

The apparatus according to the invention is thus characterized in that each collector 7 for the continuous discharge of the catalyst from the annular enclosure, said collector 7 being of substantially cylindrical shape, is so arranged that the center of the circle 7a that it cuts in the bottom of the annular enclosure 2 is located at a distance from the internal wall of the annular enclosure less than $(R-r)/3$, preferably less than $(R-r)/4$, where R is the radius of the external wall 3 of the annular enclosure 2 and r is the radius of the external wall 4 of the annular enclosure 2.

Figure 5:
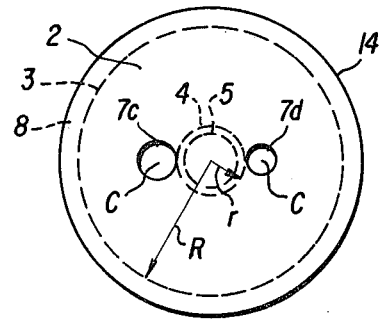

In a preferred embodiment, the circle cut by the collector 7 at the bottom of the annular enclosure 2 is also tangent to the grid 4, thus to the internal wall of the annular enclosure 2: this type of collector is shown in FIG. 5. In that case, it is preferred that the diameter of this circle, such as 7c, be less than or equal to $(R-r)/3$ or, better, less than or equal to $(R-r)/5$, shown as 7d in FIG. 5.

"Tangent" means that the collector, such as 7, is arranged as close as possible, to the immediate vicinity of the internal grid 4 of the annular enclosure, taking the mechanical possibilities into account, i.e. essentially the possible soldering of collectors 7 to the grid 4: perfectly tangential soldering is clearly impossible.

Within a reactor according to the invention, the catalyst may be present in any shape, for example, as cylinders, pills, agglomerates, extrudates, crystals, etc. It may also be used as particles, for example, as spherical balls of diameter from 1 to 3 mm, preferably from 1.5 to 2 mm, these values constituting no limit. The bulk specific gravity of a catalyst used as balls is usually from 0.4 to 1, preferably from 0.5 to 0.9, particularly from 0.55 to 0.8, these values being no limit.

The reactors according to the invention may be used for effecting such reactions as reforming, hydrogenation, dehydrogenation (for example n-paraffins or naphthenes dehydrogenation), isomerization, hydrocarbon aromatization, dehydrocyclization and hydrocracking.

These reactions are usually effected in the overall temperature range from 300° to 600° C.

Catalytic reforming reactions are usually effected at a temperature from about 450° to 580° C., at a pressure of about 5 to 20 kg/cm$^2$, the hourly reaction rate being from 0.5 to 10 volumes of liquid charge (naphtha distilling at about 60° to 220° C.) per volume of catalyst.

Hydrogenation reactions are usually effected at a temperature from about 100° to 500° C., at a pressure from about 1 to 40 kg/cm$^2$.

The isomerization reactions are usually effected at a temperature from about 200° to 600° C., at a pressure from about 0.05 to 70 kg/cm$^2$, the hourly space velocity by volume being from 0.1 to 10 times the volume of the catalyst.

The dehydrogenation reactions (for example n-paraffins dehydrogenation) or aromatization reactions ("Aromizing") are usually effected at a temperature from about 300° to 650° C., at a pressure from about 0.1 to 60 kg/cm$^2$, the hourly feed rate by volume being from 0.1 to 20 times the volume of the catalyst.

The hydrocracking reactions are generally effected at a temperature from about 260° to 530° C. at a pressure from about 10 to 80 kg/cm$^2$.

The apparatus is particularly well adapted to catalytic hydrocarbon reforming and aromatization ("Aromizing") reactions.

What we claim as our invention is:

1. In an apparatus of the radial type for effecting hydrocarbon conversions in the presence of a catalyst, comprising at least one substantially vertical elongated chamber whose cross-section by a horizontal plane is circular, the elongated chamber including at least one annular enclosure provided for receiving a moving bed of catalyst and arranged substantially vertically in the elongated chamber, each annular enclosure being delimited by a permeable external cylindrical wall and a permeable internal cylindrical wall; an internal collector adjacent to each annular enclosure, formed by the internal space of each elongated chamber and delimited by the internal cylindrical wall of each annular enclosure; an external distributor adjacent to each annular enclosure and formed by the space which is delimited by the wall of each elongated chamber and by the external cylindrical wall of each annular enclosure; an inlet connected to the external distributor adjacent to each annular enclosure for feeding the reactants; an outlet connected to the internal collector adjacent to each annular enclosure for discharging the reactants; means for introducing the catalyst at the top of each annular enclosure; and at least one catalyst collector for continuously discharging catalyst from the bottom of each annular enclosure; wherein the internal wall of each annular enclosure is provided in its upper portion with a screen to impede discharge of reactants at the top of the internal collector, the screen having a height amounting to about 80-300% of the total width of each annular enclosure and being arranged as an inverted truncated cone of upwardly increasing cross-section and having the same axis as the internal cylindrical wall of each annular enclosure, the surface area of the smaller of the two bases of the truncated cone being substantially the same as that of the cross-section of the internal cylindrical wall of each annular enclosure, and the angle which the axis of the inverted truncated cone makes with one of its generators being from 10 to 40 degrees; and wherein the upper portion of the external wall of each annular enclosure amounting to about 10-40% of the height of the annular enclosure, has the shape of a truncated cone whose cross-section increases downwardly, the greater of the two bases of the truncated cone being substantially equal to the cross-section of the external cylindrical wall of the annular enclosure, and the angle which the axis of the truncated cone makes with one of its generators being from 10 to 40 degrees;

the improvement wherein each catalyst collector for continuously discharging the catalyst from the bottom of each annular enclosure is substantially cylindrical, the top of the catalyst collector being substantially flush with the bottom of the annular enclosure, and so arranged that the center of the circle that it cuts at the bottom of the annular enclosure is located at a distance less than $(R-r)/3$ from the internal wall of the annular enclosure, where R is the radius of the external wall of the annular enclosure and r is the radius of the internal wall of the annular enclosure.

2. An apparatus according to claim 1, wherein said center of the circle is located at a distance from the internal wall of the annular enclosure which is less than $(R-r)/4$.

3. An apparatus according to claim 1, wherein the circle cut by each collector at the bottom of the annular enclosure is substantially tangent to the internal wall of the annular enclosure.

4. An apparatus according to claim 3, wherein the diameter of said circle is less than or equal to $(R-r)/3$.

5. An apparatus according to claim 3, wherein the diameter of said circle is less than or equal to $(R-r)/5$.

6. An apparatus according to claim 1, wherein the elongated chamber comprises several stacked annular enclosures.

* * * * *